R. G. WESTON.
HORN SHAPING WEIGHT.
APPLICATION FILED APR. 6, 1915.

1,287,540.

Patented Dec. 10, 1918.

Inventor
Reginald G. Weston
By Geo. F. Kimmel.
Attorney

Witnesses
C. H. Miller
E. R. Jacobson

UNITED STATES PATENT OFFICE.

REGINALD G. WESTON, OF LITTLETON, COLORADO.

HORN-SHAPING WEIGHT.

1,287,540.  Specification of Letters Patent.  Patented Dec. 10, 1918.

Application filed April 6, 1915. Serial No. 19,594.

*To all whom it may concern:*

Be it known that I, REGINALD G. WESTON, a citizen of the United States, residing at Littleton, in the county of Arapahoe and State of Colorado, have invented certain new and useful Improvements in Horn-Shaping Weights, of which the following is a specification.

This invention relates to improvements in animal husbandry, and more specifically to horn shaping weights.

The object of my invention is to provide a novel weight to be mounted upon the horns of cattle to give them the proper shape in growth as well as the proper curve which it is desired to have the horns assume while growing. My weights are extremely simple and durable in construction, economical in cost, and are made preferably of solid iron in graduated weight for use during various periods of the growth of the horns of cattle. The peculiar shape of my weight serves the double purpose of providing the greatest weight where most required, and prevents the catching of the horns or weights upon hay racks, fences, and the like.

Other objects of this invention not at this time more particularly enumerated, will be clearly understood from the detailed description and drawings forming a part of this specification.

Furthermore, this invention consists in the novel arrangement and combination of parts more particularly described in the following specification and embodied in the claims appended hereunto and forming a part of this application.

Referring now to the drawings, which are merely illustrative of my invention,

Figure 1:
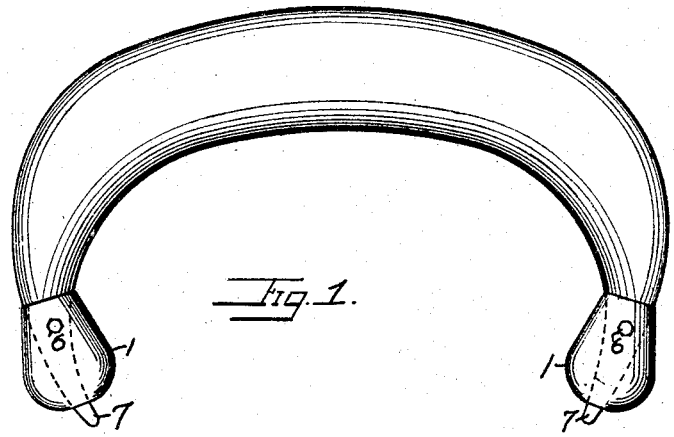
Figure 1 is a front elevation showing my horn shaping weights applied to a pair of horns, illustrating the shape induced by their use.
Figure 2:
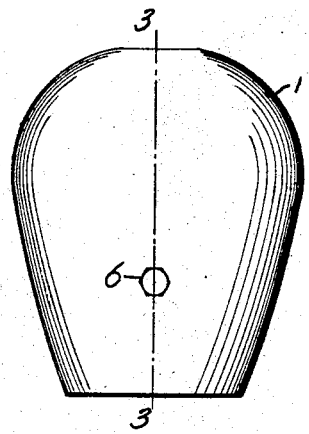
Fig. 2 is a front elevation of my novel weight.
Figure 3:
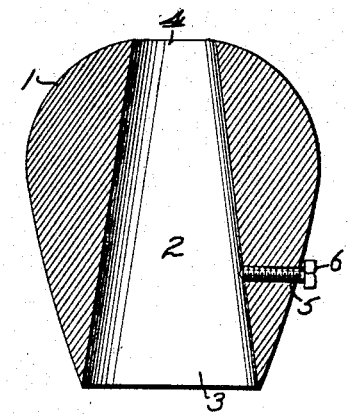
Fig. 3 is a vertical section thereof taken on the line 3—3 of Fig. 2.

Referring further to the drawings, wherein similar reference characters designate similar parts throughout the respective views, 1 designates a substantially bulb-shaped body portion formed preferably of metal, and provided with a conical perforation 2 through the longitudinal axis thereof, the larger end 3 of said perforation being coextensive with the smaller end of said body portion, and the smaller end 4 of said perforation passing through the larger end of said body portion, centrally thereof. A screw threaded hole 5 is formed through one side of said body portion at a certain point thereon, said hole terminating within the perforation 2. A set screw 6 is adapted to be inserted within said hole 5 so as to fasten the weights upon the horns 7, as shown in Fig. 3.

The utility, adaptability, and advantages of my improved form of horn shaping weights being obvious, it is unnecessary to further enlarge upon the same herein.

Having now described and pointed out the new and useful features of my invention, I do not limit myself to the shape of certain parts where the shape is not essential, nor do I restrict myself to the exact details of construction shown and described, but mean and intend to claim all equivalents and variations thereof not departing in principle from my invention and falling within the purview of the appended claims.

What I claim as my invention and desire to secure by Letters Patent is:

1. A weight or device for use in the bending of an animal's horn, comprising a substantially pear-shaped body having an axial opening tapering toward the larger end of the body, the edge of the smaller end forming an acute angle substantially without annular shoulder so that the converging end of the body blends in an obtuse angle with the horn surface without a ridge, and means for securing the weight *in situ*.

2. A method of controlling the shape and growth of the horns of animals which consists of the successive application to the horns of an animal of weights, of a series of graduated heaviness, at various periods of the growth of the horn.

In testimony whereof I affix my signature in the presence of two witnesses.

REGINALD G. WESTON.

Witnesses:
 JOHN WOLF,
 T. B. MELVIN.

Copies of this patent may be obtained for five cents each, by addressing the "Commissioner of Patents, Washington, D. C."